United States Patent [19]

Brodie

[11] 4,020,297
[45] Apr. 26, 1977

[54] ADJUSTABLE HEADSET

[76] Inventor: S. Dan Brodie, 8210 Capwell Drive, Oakland, Calif. 94621

[22] Filed: Jan. 15, 1976

[21] Appl. No.: 649,462

[52] U.S. Cl. .......................... 179/156 A; 79/182 R
[51] Int. Cl.$^2$ .......................................... H04M 1/05
[58] Field of Search ................................ 179/156 A

[56] References Cited

UNITED STATES PATENTS

| | | | |
|---|---|---|---|
| 3,440,365 | 4/1969 | Bryant et al. | 179/156 A |
| 3,524,951 | 8/1970 | Bernardi et al. | 179/156 A |
| 3,555,207 | 1/1971 | Cech | 179/156 A |
| D237,090 | 10/1975 | Yanagawa | D26/14 H |

*Primary Examiner*—William C. Cooper

*Attorney, Agent, or Firm*—Harris Zimmerman

[57] ABSTRACT

A light weight operator's headset includes a generally cylindrical housing in which is disposed a receiver transducer, and an arm pivotally joined to one end of the housing. Secured to the arm is a microphone transducer, from which a sound conductive tube extends in a pivotally and extensibly adjustable fashion to the operator's mouth. An arcuate resilient member extends obliquely from the housing to define a slot therebetween in which the outer ear is received to thereby support the headset. A channel in the arcuate member receives the conductors which extend to their respective transducers.

2 Claims, 5 Drawing Figures

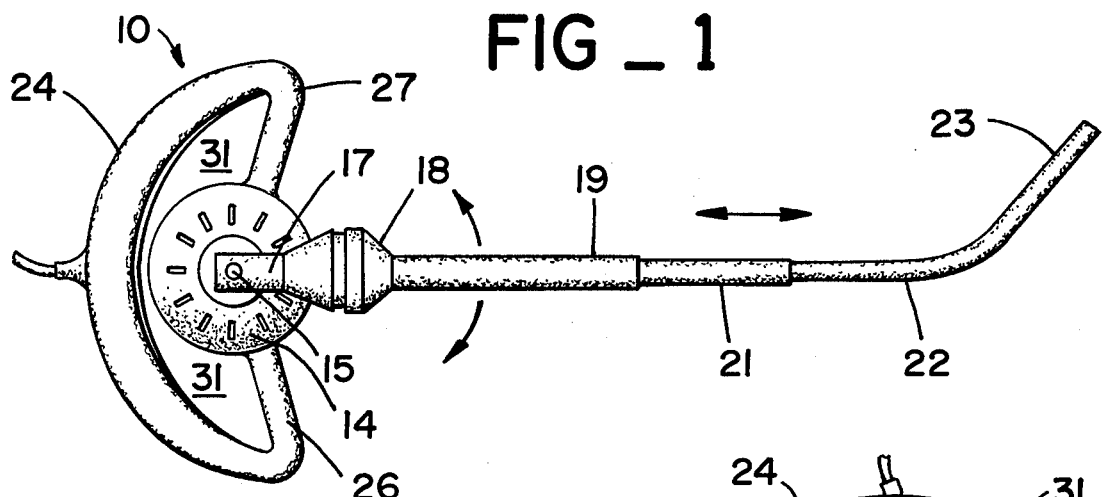
FIG_1
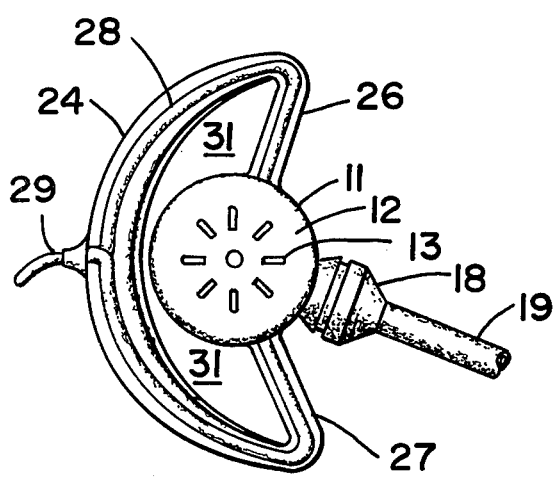
FIG_2
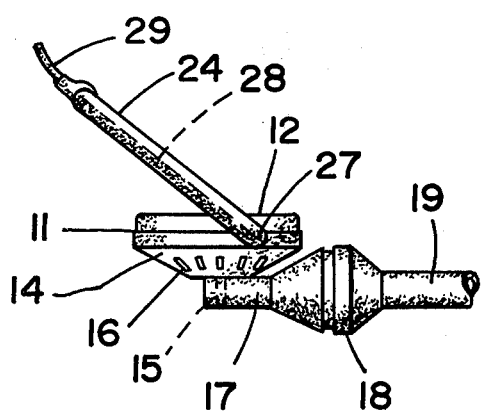
FIG_3
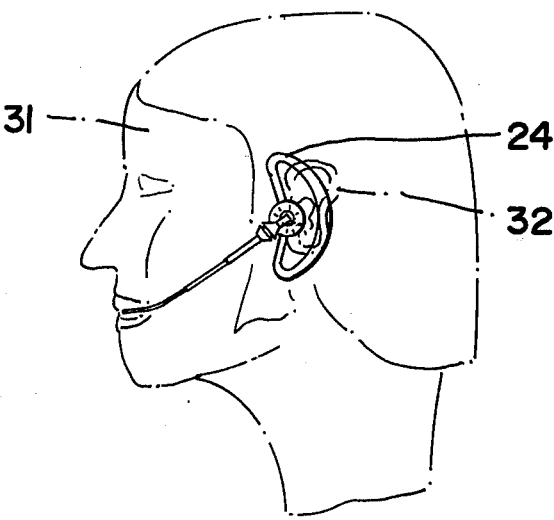
FIG_4
FIG_5

ADJUSTABLE HEADSET

BACKGROUND OF THE INVENTION

It is generally acknowledged that an operator's headset should provide good fidelity in both transmission and reception, and should be so unobtrusive when worn as to constitute no hindrance or distraction to the operator. Headsets have evolved from bulky, uncomfortable headphones which clamped to the cranium, to lightweight miniature headsets which clip to the ear or to eyeglasses. In the state of the art, the transducers are placed in a housing which is clipped behind the ear, with tubes leading from the transducers to the mouth and auditory meatus of the operator. Alternatively, the housing is clamped to the temple bar of a head bracket which resembles an eyeglass frame, with the same sort of tubes used to conduct the sound to and from the transducers.

In practice, the eyeglass frame head bracket is uncomfortable and unweildy. The housing disposed behind the ear tends to hang on the helix of the ear in an annoying fashion, and the tube extending into the meatus is also irritating. In both cases, the headsets must be manufactured in left and right ear models.

SUMMARY OF THE INVENTION

The present invention generally comprises an operator's headset for pilots and like persons which is light in weight and unobtrusive when worn. Furthermore, the headset is adjustable to the head of the operator, and may be worn on either the left or right ear. The receiver transducer projects sound directly into the meatus of the ear, obviating the need for the conventional sound conducting tube and eliminating the irritation caused thereby.

The headset of the present invention includes a generally cylindrical housing in which the receiver transducer is secured. A pair of resilient arms extend from the housing, and are joined at their distal ends by a resilient arcuate member which defines a slot between the housing and the arcuate member. The outer ear is received through this slot to support the housing in a position directly adjacent to the auditory meatus.

The outer portion of the housing terminates in a frusto-conical end to which a microphone arm is pivotally secured. The microphone arm includes a microphone transducer disposed adjacent to the housing, and a sound conducting tube extending therefrom to the area adjacent to the operator's mouth. The sound conducting tube includes a telescoping section which adjusts to suit the head of the operator, and also pivots to be aligned with the mouth of the operator.

THE DRAWING

FIG. 1 is a plan view of the headset of the present invention.

FIG. 2 is a reverse side plan view of a portion of the headset of the present invention.

FIG. 3 is an end view of the headset of the present invention.

FIG. 4 is a side elevation of a portion of the headset of the present invention.

FIG. 5 is a perspective view of the headset of the present invention as worn by an operator.

DESCRIPTION OF THE PREFERRED EMBODIMENT

With reference to the accompanying drawings, and in particular FIGS. 1–4, the present invention comprises a headset 10 which includes a generally cylindrical housing 11. Disposed within the housing 11 is a receiver transducer 9 which may comprise any of the standard electromagnetic or piezoelectric transducers known in the art. The generally perpendicular end 12 of the housing includes a plurality of holes 13 arranged symmetrically about the axis thereof for the purpose of projecting the sound from the transducer toward the meatus of the ear.

The other end 14 of the housing is formed as a frusto-conical member which includes a plurality of holes 16 which vent the housing and prevent air pressure loading of the transducer during altitude changes. A hollow pin 15 extends axially from the end 14 of the housing, and a microphone arm 17 is secured to the pin 15, as shown in FIG. 4. The pin 15 is pivotally secured in the end 14 so that the arm 17 may pivot about the axis of the housing.

Joined to the microphone arm is microphone transducer 18. The wires from the transducer 18 extend through the hollow pin 15 and into the housing 11. Extending from the transducer 18 is a hollow sound-conducting tube 19. This tube includes a telescoping portion 21 which is both extensibly and rotatably adjustable, and an end portion 22 which includes a curved end 23. The tube is thus adjustable both in rotation and length, and the curved end may be pivotted to position the distal end thereof directly in front of the mouth of the operator.

Extending radially outwardly from the housing are a pair of resilient arms 26 and 27. Joined to the distal ends of the arms is a flexible, form-retaining arcuate member 24. As shown in FIGS. 3 and 4, the member 24 extends obliquely with respect to the plane of the arms 26 and 27, and itself. As shown in FIGS. 1 and 2, the included angle therein is greater than 180°. The slot is configured to receive the outer ear of the operator therethrough, thereby supporting the headset on the head of the operator.

A groove 28 is disposed in one side of the member 24. A two-conductor cable 29 which extends to appropriate radio or other communications device is disposed in the groove 28, as shown in FIG. 2, with each conductor disposed in opposite brances of the groove. Both of the conductors extend into the housing 11, where one is connected to the wires which extend from the microphone transducer into the housing. The cable 29 is thus joined to the approximate midpoint of the member 24 is directed behind the ear and away from the attention of the operator.

To secure the headset of the present invention to the operator 31, as shown in FIG. 5, the outer ear 32 of the operator is inserted through the slot 31, the headset being retained thereat by the slight resilient pressure of the member 24 and the housing being disposed with the sound projecting holes 13 directly adjacent to the auditory meatus. The arm 17 is then pivotted about the pin 15 to position the tube end 23 near to the operator's mouth, and the tube end 23 is extended and rotated to place the tube opening directly in front of the mouth. The light weight of the headset, together with the fact that nothing is inserted in the ear, makes it virtually unnoticed by the operator.

It should be noted that although the unit is shown in FIG. 5 in use with the left ear of the operator, it can also be used equally well with the right ear. This may be accomplished merely by inverting the headset so that the arm 26 is extending downwardly and the arm 27 is extending upwardly. The right ear is inserted through the gap 31 in the same manner, and the microphone arm is adjusted as before.

It may be appreciated that the pivotting adjustment of the microphone arm, the telescoping adjustment of the tube 21, and the rotating adjustment of the tube end 23 permit accommodation to virtually any head configuration, whether the headset is worn on the right or left ear. Also, the headset provides excellent fidelity both in receiving and transmitting. Furthermore, the slot 31 can accommodate virtually any ear configuration, since it is necessary only to insert the ear through the slot to support the headset.

I claim:

1. A headset for use with a human ear having an auditory meatus comprising a generally cylindrical housing having an interior, planar end disposed adjacent to the auditory meatus and an exterior end comprising a truncated cone coaxial with said housing; a pair of arms extending radially from said housing, a flexible, arcuate member joined to the distal ends of said arms, said arms, housing, and member defining a slot therebetween through which an ear is received; the entire extent of said arcuate member and said arms including a continuous groove therein; a first transducer disposed within said housing for directing sound into said auditory meatus, a transducer arm pivotally joined to said exterior end of said housing at the axis thereof, said transducer arm including a generally cylindrical portion having truncated conical ends, said cylindrical portion disposed substantially immediately adjacent to said housing; said transducer arm including a first section fixedly secured in the distal end of said cylindrical portion and formed of hollow rigid tubular material, a second hollow rigid tubular section telescopically and rotatably received in the distal end of said first section, and a third, flexible hollow tubular section fixedly secured to the distal end of said second section; a second transducer disposed within said cylindrical portion of said arm and communicating with the bores of said tubular sections; first lead wires extending from said second transducer through said transducer arm, said cylindrical housing, and said groove in one of said arms and a portion of said groove in said arcuate member, and second lead wires extending from said first transducer through said groove in the other of said arms and the remaining portion of said groove in said arcuate member.

2. The headset of claim 1, wherein the conical surface of the proximal end of said cylindrical portion of said transducer arm is disposed substantially parallel to and directly adjacent to the conical surface of said exterior end of said cylindrical housing.

* * * * *